(12) United States Patent
Kuznicki et al.

(10) Patent No.: US 6,464,957 B1
(45) Date of Patent: Oct. 15, 2002

(54) POLYMORPH-ENRICHED ETS-4

(75) Inventors: Steven M. Kuznicki, Whitehouse Station; Richard M. Jacubinas, Somerville; Tadeuz W. Langner, Maplewood, all of NJ (US)

(73) Assignee: Engelhard Corporation, Iselin, NJ (US)

( * ) Notice: Subject to any disclaimer, the term of this patent is extended or adjusted under 35 U.S.C. 154(b) by 93 days.

(21) Appl. No.: 09/640,313

(22) Filed: Aug. 15, 2000

(51) Int. Cl.[7] .......................... C01B 33/20; C01B 37/00
(52) U.S. Cl. ................ 423/713; 423/718; 423/326
(58) Field of Search ..................... 423/713, 718, 423/326

(56) References Cited

U.S. PATENT DOCUMENTS

| | | | |
|---|---|---|---|
| 3,010,789 A | * 11/1961 | Milton | ........... 423/718 |
| 4,938,939 A | 7/1990 | Kuznicki | |
| 5,397,561 A | * 3/1995 | Smith | ........... 423/718 |
| 5,989,316 A | * 11/1999 | Kuznicki et al. | |
| 6,068,682 A | 5/2000 | Kuznicki et al. | |

OTHER PUBLICATIONS

Structure of Strontim Ion–Exchanged ETS–4 Microporous Molecular Sieves, by Braunbarth, et. al., Chem. Mater. vol. 12, No. 7, Jun. 2000.

* cited by examiner

*Primary Examiner*—David Sample
(74) *Attorney, Agent, or Firm*—Stuart D. Frenkel

(57) ABSTRACT

ETS-4 crystalline titanium silicate is produced so as to be enriched in at least one polymorph thereof which contains channels which interpenetrate the crystal lattice in both the b- and c-directions. A process of producing such a polymorph and enriched ETS-4 titanium silicate comprises the addition of a wetting agent to the reaction mixture.

21 Claims, 5 Drawing Sheets

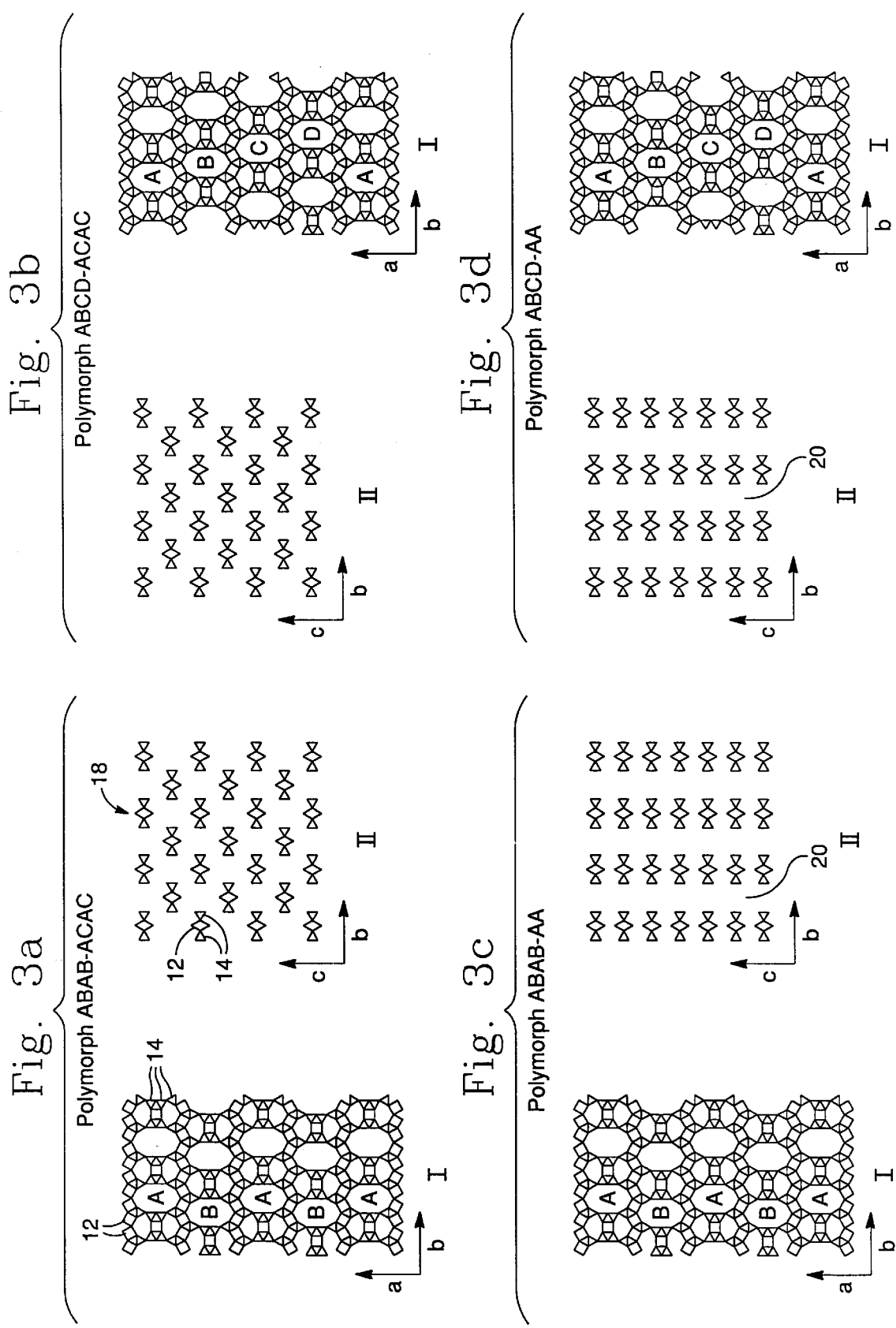
Fig. 3a Polymorph ABAB-ACAC
Fig. 3b Polymorph ABCD-ACAC
Fig. 3c Polymorph ABAB-AA
Fig. 3d Polymorph ABCD-AA

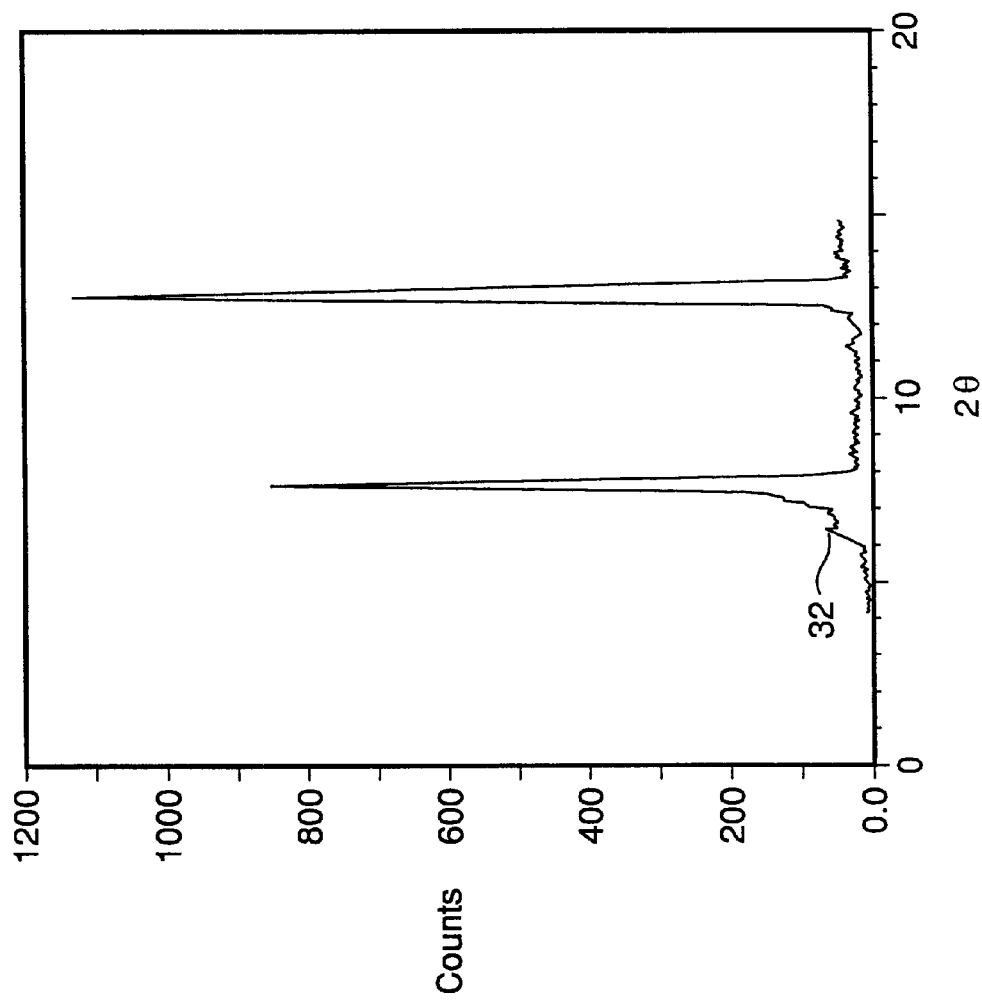

POLYMORPH-ENRICHED ETS-4

FIELD OF THE INVENTION

This invention relates to methods for preparing new crystalline titanium molecular sieve zeolite compositions. More particularly, the invention is directed to improved variants of ETS-4, and methods of forming same.

BACKGROUND OF THE INVENTION

Since the discovery by Milton and coworkers (U.S. Pat. Nos. 2,882,243 and 2,882,244) in the late 1950's that aluminosilicate systems could be induced to form uniformly porous, internally charged crystals, analogous to molecular sieve zeolites found in nature, the properties of synthetic aluminosilicate zeolite molecular sieves have formed the basis of numerous commercially important catalytic, adsorptive and ion-exchange applications. This high degee of utility is the result of a unique combination of high surface area and uniform porosity dictated by the "framework" structure of the zeolite crystals coupled with the electrostatically charged sites induced by tetrahedrally coordinated $Al^{+3}$. Thus, a large number of "active" charged sites are readily accessible to molecules of the proper size and geometry for adsorptive or catalytic interactions. Further, since charge compensating cations are electrostatically and not covalently bound to the aluminosilicate framework, they are generally base exchangeable for other cations with different inherent properties. This offers wide latitude for modification of active sites whereby specific adsorbents and catalysts can be tailormade for a given utility.

In the publication "Zeolite Molecular Sieves", Chapter 2, 1974, D. W. Breck hypothesized that perhaps 1,000 aluminosilicate zeolite framework structures are theoretically possible, but to date only approximately 150 have been identified. While compositional nuances have been described in publications such as U.S. Pat. Nos. 4,524,055; 4,603,040; and 4,606,899, totally new aluminosilicate framework structures are being discovered at a negligible rate.

With slow progress in the discovery of new aluminosilicate based molecular sieves, researchers have taken various approaches to replace aluminum or silicon in zeolite synthesis in the hope of generating either new zeolite-like framework structures or inducing the formation of qualitatively different active sites than are available in analogous aluminosilicate based materials.

It has been believed for a generation that phosphorus could be incorporated, to varying degrees, in a zeolite type aluminosilicate framework. In the more recent past (JACS 104, pp. 1146 (1982); proceedings of the $7^{th}$ International Zeolite Conference, pp. 103–112, 1986) E. M. Flanigan and coworkers have demonstrated the preparation of pure aluminophosphate based molecular sieves of a wide variety of structures. However, the site inducing $Al^{+3}$ is essentially neutralized by the $P^{+5}$, imparting a +1 charge to the framework. Thus, while a new class of "molecular sieves" was created, they are not zeolites in the fundamental sense since they lack "active" charged sites.

Realizing this inherent utility limiting deficiency, for the past few years the research community has emphasized the synthesis of mixed aluminosilicate-metal oxide and mixed aluminophosphate-metal oxide framework systems. While this approach to overcoming the slow progress in aluminosilicate zeolite synthesis has generated approximately 200 new compositions, all of them suffer either from the site removing effect of incorporated $P^{+5}$ or the site diluting effect of incorporating effectively neutral tetrahedral +4 metal into an aluminosilicate framework. As a result, extensive research in the research community has failed to demonstrate significant utility for any of these materials.

A series of zeolite-like "framework" silicates have been synthesized, some of which have larger uniform pores than are observed for aluminosilicate zeolites. (W. M. Meier, Proceedings of the $7^{th}$ International Zeolite Conference, pp. 13–22 (1986)). While this particular synthesis approach produces materials which, by definition, totally lack active, charged sites, back implantation after synthesis would not appear out of the question although little work appears in the open literature on this topic.

Another and most straightforward means of potentially generating new structures or qualitatively different sites than those induced by aluminum would be the direct substitution of some charge inducing species for aluminum in a zeolite-like structure. To date the most notably successful example of this approach appears to be boron in the case of ZSM-5 analogs, although iron has also been claimed in similar materials. (EPA 68,796 (1983), Taramasso, et. al.; Proceedings of the $5^{th}$ International Zeolite Conference; pp. 40–48 (1980)); J. W. Ball, et. al.; Proceedings of the $7^{th}$ International Zeolite Conference; pp. 137–144 (1986); U.S. Pat. No. 4,280,305 to Kouenhowen, et. al. Unfortunately, the low levels of incorporation of the species substituting for aluminum usually leaves doubt if the species are occluded or framework incorporated.

In 1967, Young in U.S. Pat. No. 3,329,481 reported that the synthesis of charge bearing (exchangeable) titaniumsilicates under conditions similar to aluminosilicate zeolite formation was possible if the titanium was present as a "critical reagent" +III peroxo species. While these materials were called "titanium zeolites" no evidence was presented beyond some questionable X-ray diffraction (XRD) patterns and his claim has generally been dismissed by the zeolite research community. (D. W. Breck, Zeolite Molecular Sieves, p. 322 (1974); R. M. Barrer, Hydrothermal Chemistry of Zeolites, p. 293 (1982); G. Perego, et. al., Proceedings of $7^{th}$ International Zeolite conference, p. 129 (1986)). For all but one end member of this series of materials (denoted TS materials), the presented XRD patterns indicate phases too dense to be molecular sieves. In the case of the one questionable end member (denoted TS-26), the XRD pattern might possibly be interpreted as a small pored zeolite, although without additional supporting evidence, it appears extremely questionable.

A naturally occurring alkaline titanosilicate identified as "Zorite" was discovered in trace quantities on the Siberian Tundra in 1972 (A. N. Mer'kov, et. al.; Zapiski vses Mineralog. Obshch., pp. 54–62 (1973)). The published XRD pattern was challenged and a proposed structure reported in a later article entitled "The OD Structure of Zorite", Sandomirskii, et. al., Sov. Phys. Crystallogr. 24(6), Nov.-Dec. 1979, pp. 686–693.

No further reports on "titanium zeolites" appeared in the open literature until 1983 when trace levels of tetrahedral Ti(IV) were reported in a ZSM-5 analog. (M. Taramasso, et. al.; U.S. Pat. No. 4,410,501 (1983); G. Perego, et. al.; Proceedings of the $7^{th}$ International Zeolite Conference; p. 129 (1986)). A similar claim appeared from researchers in mid-1985 (EPA 132,550 (1985)). The research community reported mixed aluminosilicate-titanium (IV) (EPA 179,876 (1985); EPA 181,884 (1985) structures which, along with TAPO (EPA 121,232 (1985) systems, appear to have no possibility of active titanium sites. As such, their utility, has been limited to catalyzing oxidation.

In U.S. Pat. No. 4,938,939, issued Jul. 3, 1990, Kuznicki disclosed a new family of synthetic, stable crystalline titaniumsilicate molecular sieve zeolites which have a pore size of approximately 3–4 Angstrom units and a titania/silica mole ratio in the range of from 1.0 to 10. The entire content of U.S. Pat. No. 4,938,939 is herein incorporated by reference. These titanium silicates have a definite X-ray diffraction pattern unlike other molecular sieve zeolites and can be identified in terms of mole ratios of oxides as follows:

$$1.0 \pm 0.25 \, M_{2/n}O:TiO_2:YSiO_2:ZH_2O$$

wherein M is at least one cation having a valence of n, Y is from 1.0 to 10.0, and Z is from 0 to 100. In a preferred embodiment, M is a mixture of alkali metal cations, particularly sodium and potassium, and y is at least 2.5 and ranges up to about 5.

The original cations M can be replaced at least in part with other cations by well-known exchange techniques. Preferred replacing cations include hydrogen, ammonium, rare earth, and mixtures thereof. Members of the family of molecular sieve zeolites designated ETS-4 in the rare earth-exchanged form have a high degree of thermal stability of at least 450° C. or higher depending on cationic form, thus rendering them effective for use in high temperature catalytic processes. ETS zeolites are highly adsorptive toward molecules up to approximately 3–5 Angstroms in critical diameter, e.g. water, ammonia, hydrogen sulfide, $SO_2$, and n-hexane and are essentially non-adsorptive toward molecules which are larger than 5 Angstroms in critical diameter.

Members of the ETS-4 molecular sieve zeolites have an ordered crystalline structure and an X-ray powder diffraction pattern having the following significant lines:

TABLE 1

| XRD POWDER PATTERN OF ETS-4 (0–40° 2 theta) | |
|---|---|
| SIGNIFICANT d-SPACING (ANGS.) | I/I$_0$ |
| 11.65 ± 0.25 | S-VS |
| 6.95 ± 0.25 | S-VS |
| 5.28 ± 0.15 | M-S |
| 4.45 ± 0.15 | W-M |
| 2.98 ± 0.05 | VS |

In the above table,
VS = 50–100
S = 30–70
M = 15–50
W = 5–30

The above values were collected using standard techniques on a Phillips APD3720 diffractometer equipped with a theta compensator.

A large pore crystalline titanium molecular sieve composition having a pore size of about 8 Angstrom units has also been developed by the present assignee and is disclosed in U.S. Pat. No. 4,853,202, which patent is herein incorporated by reference. This crystalline titanium silicate molecular sieve has been designated ETS-10.

The new family of microporous titanosilicates developed by the present assignee, and generically denoted as ETS, are constructed from fundamentally different building units than classical aluminosilicate zeolites. Instead of interlocked tetrahedral metal oxide units as in classical zeolites, the ETS materials are composed of interlocked octahedral chains and classical tetrahedral rings. In general, the chains consist of six oxygen-coordinated titanium octahedra wherein the chains are connected three dimensionally via tetrahedral silicon oxide units or bridging titanosilicate units. The inherently different crystalline titanium silicate structures of these ETS materials have been shown to produce unusual and unexpected results when compared with the performance of aluminosilicate zeolite molecular sieves. For example, the counter-balancing cations of the crystalline titanium silicates are associated with the charged titania chains and not the uncharged rings which form the bulk of the structure. In ETS-10, this association of cations with the charged titania chains is widely recognized as resulting in the unusual thermodynamic interactions with a wide variety of sorbates which have been found. This includes relative weak binding of polar species such as water and carbon dioxide and relatively stronger binding of larger species, such as propane and other hydrocarbons. These thermodynamic interactions form the heart of low temperature dessication processes as well as evolving Claus gas purification schemes. The unusual sorbate interactions are derived from the titanosilicate structure, which places the counter-balancing cations away from direct contact with the sorbates in the main ETS-10 channels.

In recent years, scores of reports on the structure, adsorption and, more recently, catalytic properties of wide pore, thermally stable ETS-10 have been made on a worldwide basis. This worldwide interest has been generated by the fact that ETS-10 represents a large pore thermally stable molecular sieve constructed from what had previously been thought to be unusable atomic building blocks.

Although ETS-4 was the first molecular sieve discovered which contained the octahedrally coordinated framework atoms and as such was considered an extremely interesting curiosity of science, ETS-4 has been virtually ignored by the world research community because of its small pores and reported low thermal stability. Recently, however, researchers of the present assignee have discovered a new phenomenon with respect to ETS-4. In appropriate cation forms, the pores of ETS-4 can be made to systematically shrink from slightly larger than 4 Å to less than 3 Å during calcinations, while maintaining substantial sample crystallinity. These pores may be "frozen" at any intermediate size by ceasing thermal treatment at the appropriate point and returning to ambient temperature. These controlled pore size materials are referred to as CTS-1 (contracted titanosilicate-1) and are described in commonly assigned, U.S. Pat. No. 6,068,682, issued May 30, 2000. Thus, ETS-4 may be systematically contracted under appropriate conditions to CTS-1 with a highly controllable pore size in the range of 3–4 Å. With this extreme control, molecules in this range may be separated by size, even if they are nearly identical. The systematic contraction of ETS-4 to CTS-1 to a highly controllable pore size has been named the Molecular Gate™ effect. This effect is leading to the development of separation of molecules differing in size by as little as 0.1 Angstrom, such as $N_2/O_2$ (3.6 and 3.5 Angstroms, respectively), $CH_4/N_2$ (3.8 and 3.6 Angstroms), or $CO/H_2$ (3.6 and 2.9 Angstroms). High pressure $N_2/CH_4$ separation systems are now being developed. This profound change in adsorptive behavior is accompanied by systematic structural changes as evidenced by X-ray diffraction patterns and infrared spectroscopy.

As synthesized, ETS-4 has an approximately 4 Å effective pore diameter. Reference to pore size or "effective pore diameter" defines the effective diameter of the largest gas molecules significantly adsorbed by the crystal. This may be significantly different from, but systematically related to, the crystallographic framework pore diameter. For ETS-4, the effective pore is defined by eight-membered rings formed from $TiO_6^{2-}$ octahedra and $SiO_4$ tetrahedra. This pore is analogous to the functional pore defined by the eight-membered tetrahedral metal oxide rings in traditional small-pored zeolite molecular sieves. Unlike the tetrahedrally based molecular sieves, however, the effective pore size of the eight-membered ring in ETS-4 can be systematically and permanently contracted with structural dehydration to CTS-1 materials as above described.

The pores of ETS-4 formed by the eight-membered polyhedral $TiO_6$ and $SiO_4$ units are non-faulted in a singular direction, the b-direction, of the ETS crystal and, thus, fully penetrate the crystal, rendering the ETS-4 and the related contracted version, CTS-1, extremely useful for molecular separations whether in the liquid, or gaseous state. The crystal lattice structure of ETS-4, however, is highly faulted along the other two of the three-dimensional axes. These faulted a- and c-directions are permeated by various small channel systems which are not interpenetrating and which contain serious diffusion blocks. Due to the open channels along the b-direction, and faulting in the a- and c-directions of the ETS-4 framework, it has been proposed that ETS-4 can be described as an intergrowth of four polymorphs. Two of the polymorphs contain non-blocked 12-ring pores disposed along the c-direction of the unit cell of ETS-4. These twelve-ring pores of approximately 6 Angstroms in these two polymorphs are aligned into channels along the c-direction of the ETS-4 framework structure without faulting. An ETS-4 molecular sieve formed of, or enriched by either or both of these c-channel polymorphs would yield intermediate and large pore variants of ETS-4 and, importantly, provide a superior CTS-type separation agent, capable of separating molecules having a size range of from 6 down to 4 Angstroms or less. Such polymorph-enriched ETS-4 would have the ability to participate in a greatly increased number of adsorptive separations relative to that believed possible with ETS-4 and contracted versions thereof formed from a random ETS intergrowth.

SUMMARY OF THE INVENTION

In accordance with the present invention, an ETS-4 titanium silicate is formed comprising enriched amounts of polymorphs which contain channels formed from 12-ring pores, which channels inter-penetrate the framework of the ETS-4 along the c-direction. The c-channeled polymorph-enriched ETS-4 also contains the interconnecting 8-ring pores along the b-direction of the ETS framework. The interconnecting pores along both the b- and c-directions can be systematically contracted to CTS-type materials by thermal dehydration without destroying the crystal structure of the titanium silicate. The polymorph-enriched ETS-4 and its contracted versions can separate by adsorption a greater number of gaseous and liquid molecules from mixtures containing the same than previously thought using ETS-4. Thus, whereas ETS-4 formed from an intergrowth of randomly arranged polymorphs can provide separation of molecules ranging in size from 4 Å to about 2.5 Å, the C-channeled polymorph-enriched ETS-4 is capable of separating molecules ranging in size from approximately 6 Å to 4 Å.

The C-channeled polymorph-enriched ETS titanium silicate molecular sieve is formed in accordance with this invention by heating a reaction mixture containing a titanium source, a source of silica, a source of alkalinity, water and a wetting agent to a temperature of from about 100° C. to 300° C. for a period time ranging from 8 hours to 40 days while controlling the pH range within the range used for ETS-4 formation. It has been found that the addition of the wetting agent to the crystalline titanium silicate-forming mixture results in an ETS-4 molecular sieve which is enriched in either or both of the polymorphs which contain interconnecting pores of 3 Å to 4 Å in diameter along the b-direction of the framework and interconnecting pores of 4 Å to 6 Å along the c-direction of the ETS-4 framework.

BRIEF DESCRIPTION OF THE DRAWINGS

FIGS. 3(a)–3(d) are two-dimensional polyhedral depictions of the four pure polymorphs of ETS-4, respectively, wherein I is a cross-section across the c-direction of the ETS-4 framework and II is a section across the a-direction of the ETS-4 framework.

FIG. 6 is an X-ray diffraction pattern (0°–15°, 2θ) of a polymorph-enriched ETS-4.

DETAILED DESCRIPTION OF THE INVENTION

Figure 1:
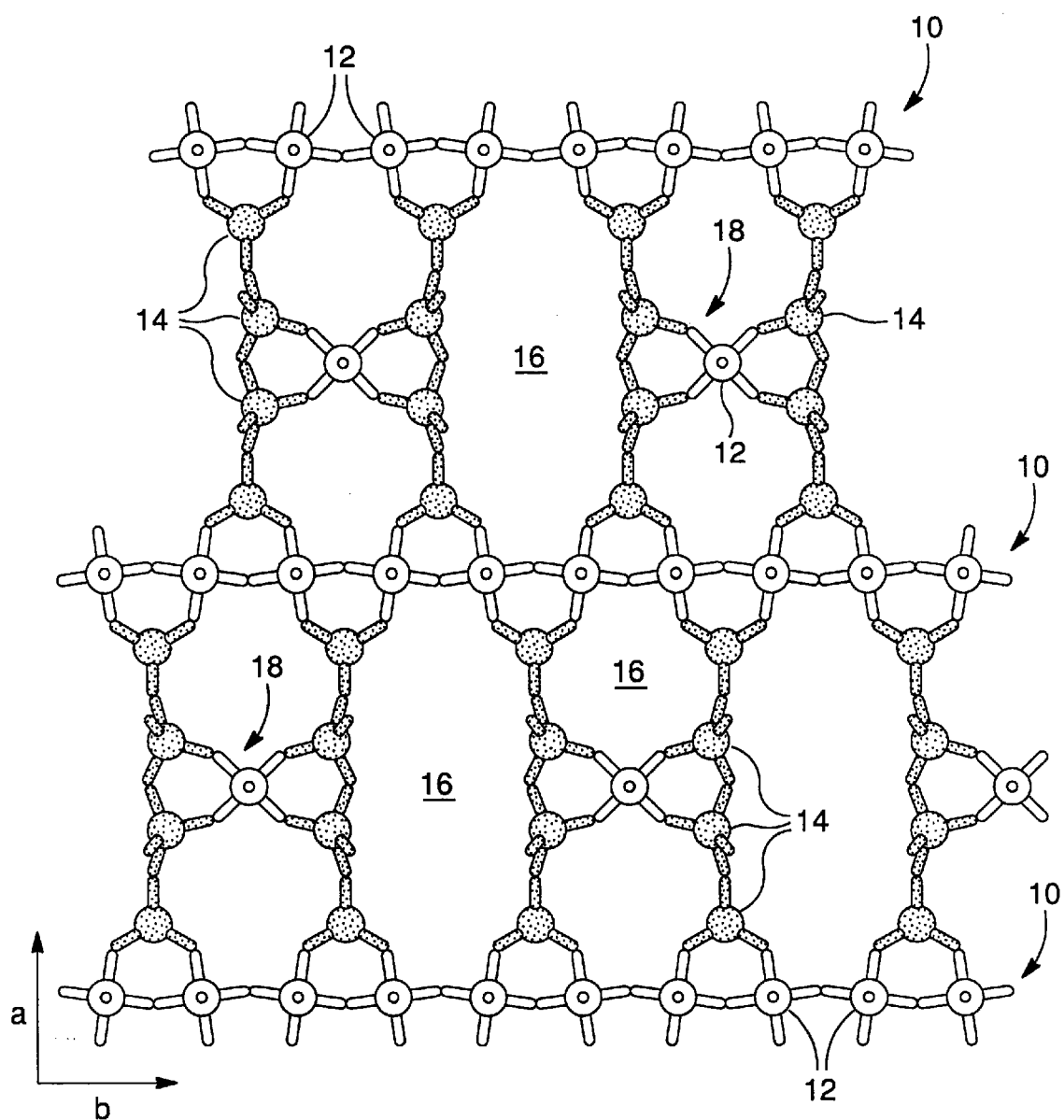
FIG. 1 is a skeletal depiction of ETS-4 taken as a section across the c-direction of the ETS-4 framework.

ETS-4 molecular sieve zeolites are prepared in accordance with aforementioned U.S. Pat. No. 4,938,939 from a reaction mixture containing a titanium source such as titanium trichloride, a source of silica, a source of alkalinity such as an alkali metal hydroxide, water and, optionally, an alkali metal fluoride having a composition in terms of mole ratios falling within the following ranges.

TABLE 2

|  | Broad | Preferred | Most Preferred |
| --- | --- | --- | --- |
| $SiO_2/Ti$ | 1–10 | 1–10 | 2–3 |
| $H_2O/SiO_2$ | 2–100 | 5–50 | 10–25 |
| $M_n/SiO_2$ | 0.1–10 | .5–5 | 1–3 | wherein M indicates the cations of valence n derived from the alkali metal hydroxide and potassium fluoride and/or alkali metal salts used for preparing the titanium silicate according to the invention. The reaction mixture is heated to a temperature of from about 100° C. to 300° C. for a period of time ranging from about 8 hours to 40 days, or more. The hydrothermal reaction is carried out until crystals are formed and the resulting crystalline product is thereafter separated from the reaction mixture by cooling to room temperature filtering and water washed. The reaction mixture can be stirred although it is not necessary. It has been found that when using gels, stirring is unnecessary but can be employed. When using sources of titanium which are solids, stirring is beneficial. The preferred temperature range is 150° C. to 250° C. for a period of time ranging from 12 hours to 15 days. Crystallization is performed in a continuous or batchwise manner under autogeneous pressure in an autoclave or static bomb reactor. Following the water washing step, the crystalline ETS-4 is dried at temperatures of 100° to 400° F. for periods ranging up to 30 hours.

The method for preparing ETS-4 compositions comprises the preparation of a reaction mixture constituted by sources of silica, sources of titanium, sources of alkalinity such as sodium and/or potassium oxide and water having a reagent molar ratio composition as set forth in Table 2. Optionally, sources of fluoride such as potassium fluoride can be used, particularly to assist in solubilizing a solid titanium source such as $Ti_2O_3$. However, when titanium silicates are prepared from gels, its value is greatly diminished.

The silica source includes most any reactive source of silicon such as silica, silica hydrosol, silica gel, silicic acid, alkoxides of silicon, alkali metal silicates, preferably sodium or potassium, or mixtures of the foregoing.

The titanium oxide source includes trivalent or tetravalent titanium compounds such as titanium trichloride, $TiCl_3$, tetrachloride, $TiCl_4$, titanium sulfate, $Ti(SO_4)_2$, titanium oxychloride, $TiOCl_2$, etc. Solid sources of titanium oxide can also be used including $TiO_2$ (rutile, anatase or brookite), and $Ti_2O_3$.

The source of alkalinity is preferably an aqueous solution of an alkali metal hydroxide, such as sodium hydroxide, which provides a source of alkali metal ions for maintaining electrovalent neutrality and controlling the pH of the reaction mixture within the range of 10.45 to 11.0±1. The alkali metal hydroxide serves as a source of sodium oxide which can also be supplied by an aqueous solution of sodium silicate.

The titanium silicate ETS-4 prepared according to U.S. Pat. No. 4,938,939 and the improved method (discussed below) of this invention contains no deliberately added alumina, and may contain very minor amounts of $Al_2O_3$ due to the presence of impurity levels in the reagents employed, e.g., sodium silicate, and in the reaction equipment. The molar ratio of $SiO_2/Al_2O_3$ will be 0 or higher than 5000 or more.

The ETS-4 as synthesized can have the original components thereof replaced by a wide variety of others according to techniques well known in the art. Typical replacing components would include hydrogen, ammonium, alkyl ammonium and aryl ammonium and metals, including mixtures of the same. The hydrogen form may be prepared, for example, by substitution of original sodium with ammonium. The composition is then calcined at a temperature of, say, 1000° F. causing evolution of ammonia and retention of hydrogen in the composition, i.e., hydrogen and/or decationized form. Of the replacing metals, preference is accorded to metals of Groups II, IV and VIII of the Periodic Table, preferably the rare earth metals.

The crystalline titanium silicates are then preferably washed with water and dried at a temperature ranging from 150° F. to about 600° F. and may thereafter be calcined in air or other inert gas at temperatures ranging from 500° F. to 1500° F. for periods of time ranging from 1 to 48 hours or more.

Regardless of the synthesized form of the titanium silicate, ETS-4, the spatial arrangement of atoms which form the basic crystal lattices remain essentially unchanged by the replacement or sodium or other alkali metal or by the presence in the initial reaction mixture of metals in addition to sodium, as determined by an X-ray powder diffraction pattern of the resulting titanium silicate. The X-ray diffraction patterns of such products are essentially the same as those set forth in Table 1 above.

Figure 4:
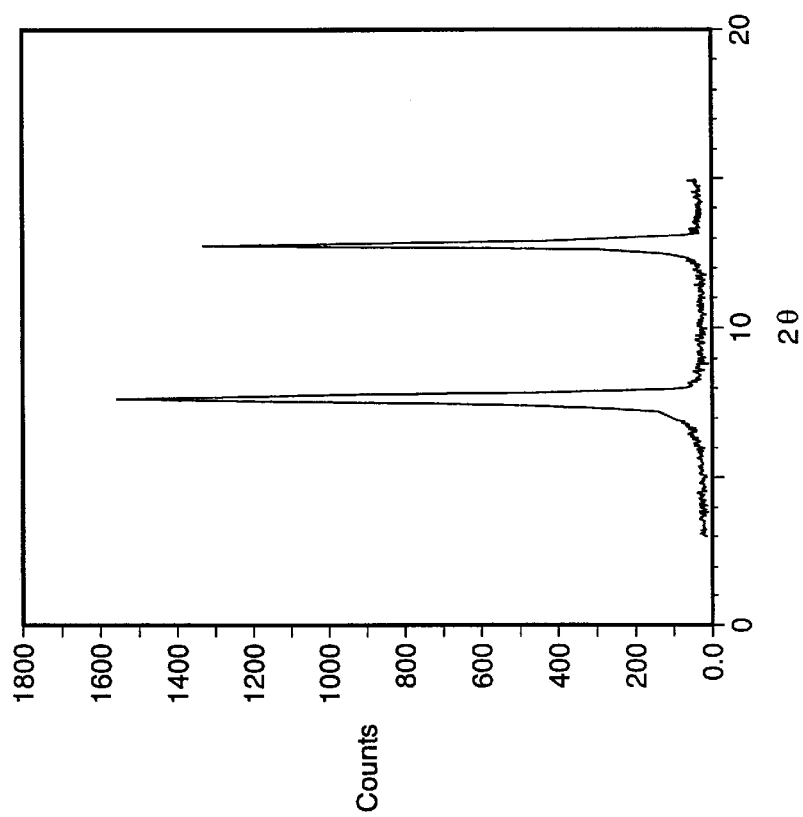
FIG. 4 is an X-ray diffraction pattern of ETS-4 (0°–15°, 2θ) of a standard prepared ETS-4.

FIG. 4 is an X-ray diffraction pattern of a standard prepared ETS-4 crystal lattice. The two strong —very strong single peaks shown correspond to the d-spacings of 11.65 Å and 6.95 Å depicted in Table 1 above. As will be discussed later, the XRD pattern of FIG. 4 which represents an ETS-4 having a random stacking of the four polymorphs which form ETS-4 is different from the XRD pattern found with the polymorph-enriched ETS-4 in which interpenetrating 12-ring pores are located along the c-direction of the ETS-4 framework. The polymorph-enriched ETS-4 can be considered as a new titanosilicate species and has been named ETS-6.

Figure 2:
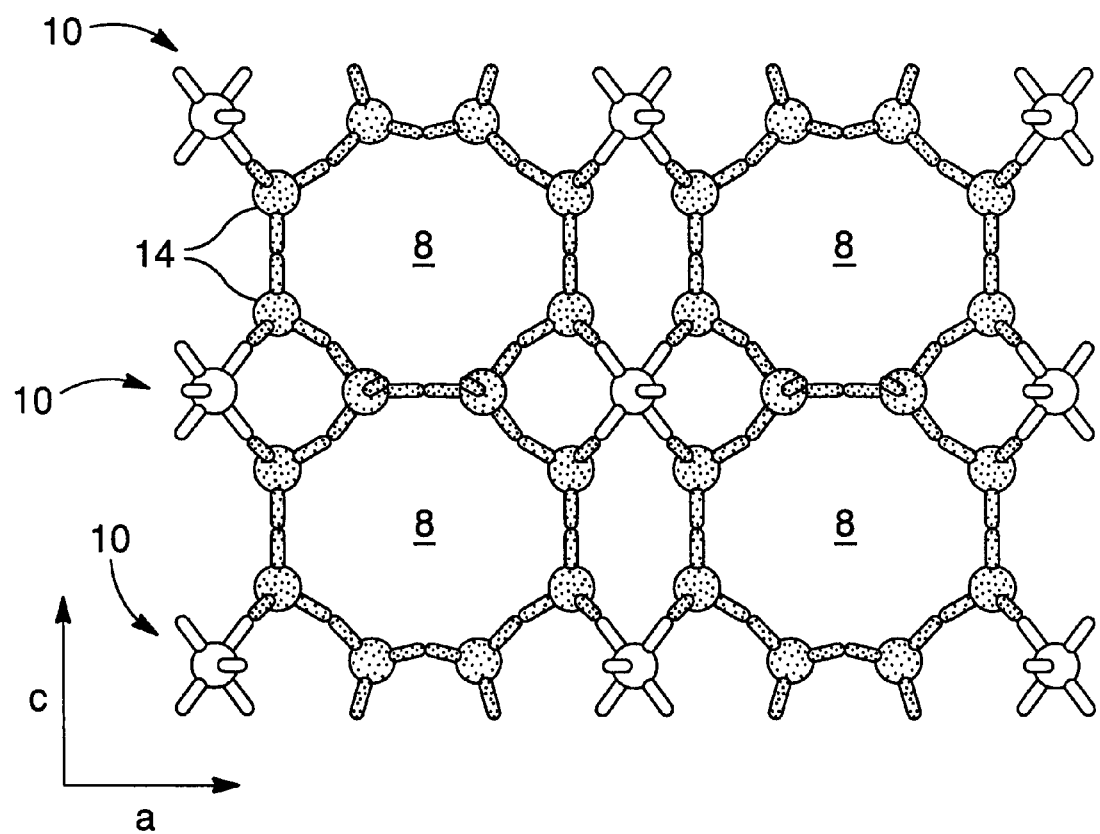
FIG. 2 is a skeletal depiction of ETS-4 taken as a section across the b-direction of the ETS-4 framework.

The individual polymorphs, which form the ETS-4 framework are depicted in FIGS. 3(a) through 3(d) and can be described in connection with FIGS. 1, 2, and 3(a)–(d). The ETS materials are composed of chains 10 of six oxygen-coordinated titanium octahedra 12, which are disposed along the b-direction of the ETS framework and which are connected in the a- and c-directions via tetrahedral silicon oxide units 14, see FIGS. 1 and 2. The titania chains 10 which run along the b-axis are connected along the a-axis by 12-membered rings 16 formed by two pairs of titania octahedra 12 placed along the b-direction and spaced from each other in the a-direction, and two pairs of four silica tetrahedra 14 spaced from each other in the b-direction and which interconnect the two titania chains 10 in the a-direction. In the c-direction, the titania chains are connected via a pair of interconnecting silica tetrahedra 14 as shown in FIG. 2. The structure of ETS-4 is highly faulted in the a- and c-directions of the framework. Regardless of the extent of faulting in the a- and c-directions, the ETS-4 crystal lattice contains open channels along the b-direction which interpenetrate the ETS-4 framework.

It has been proposed that ETS-4 is an inter-growth of four pure polymorphs, which are shown in FIGS. 3(a)–3(d). All of the polymorphs of ETS-4 are faulted (diffusion blocked) in the a-direction in view of links of silica tetrahedra which cross the plane of the a-axis of the lattice structure while connecting the titania chains in the c-direction. These silica tetrahedral links also form pores which are too small to provide a functional interpenetrating network of diffusion channels. Two of the polymorphs are faulted in the c-direction while the other two polymorphs are non-faulted in the c-direction providing an ETS-4 framework which contains 12-ring pores which interpenetrate the framework. The two polymorphs of ETS-4 which are faulted in the c-direction are shown in FIGS. 3(a) and 3(b). Regarding FIGS. 3(a) and 3(b), the ETS-4 framework as shown includes an arrangement of 12-ring pores which penetrate the framework in the c-direction. As seen in FIG. 3(a), the open 12-ring pores are arranged in an alternating ABAB arrangement along the a-direction of the framework. Thus, every other 12-ring pore placed along the a-direction is located at the same position on the b-axis of the framework. In FIG. 3(b), the 12-ring pores are arranged in an ABCD arrangement in which every fifth 12-ring pore placed along the a-direction is at the same location on the b-axis of the framework. The faulting in the c-direction in each of the polymorphs shown in FIGS. 3(a) and 3(b) is due to the ACAC placement of titanosilicate bridges 18 across alternating 12-ring pores along the b- and c-directions. The titanosilicate bridges 18 include a titania octahedra 12 bridging two pairs of silica tetrahedra 14 forming a portion of the 12-membered ring pore. The faulting can be seen in FIGS. 3(a) and 3(b), Section II, where the titanosilicate bridges 18 are present in alternate pores along both the b- and c-directions of the ETS-4 framework. The 12-ring pores cannot form interpenetrating channels in the c-direction and are essentially diffusion blocked.

The ETS-4 polymorphs, which are non-faulted in the c-direction are shown in FIGS. 3(c) and 3(d). As in the polymorphs shown in FIGS. 3(a) and 3(b), the 12-ring pores open along the c-direction are arranged along the a- and b-directions by an ABAB arrangement as shown in FIG. 3(c)

and an ABCD arrangement as shown in FIG. 3(d). The 12-ring pores having the equivalent position on the b-axis are shown by the letter "A" in the respective figures. Unlike the polymorphs in FIGS. 3(a) and 3(b), however, the polymorphs shown in FIGS. 3(c) and 3(d) have the titanosilicate bridges 18 aligned in uniform rows in the b- and c-directions. In these polymorphs, all of the 12-ring pores spaced along the c-direction and which are at the same location on the b-axis of the ETS-4 lattice framework are either constricted with the titanosilicate bridges 18, or are free of the titanosilicate bridges 18 leading to formation of 12-ring channels in the c-direction which interpenetrate the ETS-4 framework. This is shown in FIGS. 3(c) and 3(d), Section II as channels 20.

Under the synthesis conditions of ETS-4 as described in U.S. Pat. No. 4,938,939, the individual polymorphs of ETS-4 shown in FIGS. 3(a)–3(d) are randomly stacked to form the crystal framework. Accordingly, the ETS-4 crystal which forms is highly faulted in the c-direction. The 8-ring pores open in the b-direction remain unfaulted regardless of how the polymorphs are stacked or distributed and form b-channels which interpenetrate the ETS-4 framework. The open b-channels provide the useful adsorption and separation properties of ETS-4 heretofore found. By enriching the ETS-4 crystal which is formed with the polymorphs ABAB-AA shown in FIG. 3(c) and/or ABCD-AA shown in FIG. 3(d), the ETS-4 crystal now includes intermediate sized pores along the c-direction in addition to the small pores present along the b-direction of the framework.

Importantly, the 12-ring pores along the c-direction can also be contracted by thermal treatment without destruction of the lattice structure into CTS-type materials. By controlling the thermal treatment and the shrinkage of the pores, selective adsorption of one of similar sized molecules can be readily achieved. Previous to this invention, CTS-1 materials formed by controlled shrinkage of the b-channels in ETS-4 had pores which could be controlled in size from about 4 Å to approximately 2.5 Å. By enriching ETS-4 with the polymorphs which are non-faulted in the c-direction, formation of CTS materials having pores sized from about 6 Å to 2.5 Å can be obtained. The presence of the additional intermediate sized interpenetrating pores provides ETS-4 and contracted versions thereof with the ability to separate a substantially wider number of molecular mixtures.

In accordance with this invention, ETS-4 is formed containing an enriched portion of those polymorphs which have the interconnecting 12-ring pores in the c-direction of the framework as shown in FIGS. 3(c) and 3(d). These novel ETS-4 structures are formed by incorporating within the reaction mixture which contains a titanium source, a silica source, a source of alkalinity and water, a wetting agent which is able to reduce the surface tension of the reaction mixture. The preferred wetting agents are surfactants which can be anionic, non-ionic, or amphoteric in nature or mixtures of the various types of surfactants can be used.

Anionic surfactants appear to be preferred. Examples of suitable anionic surfactants are water-soluble salts of the higher alkyl sulfates, such as sodium lauryl or other suitable alkyl sulfates having 8 to 18 carbon atoms in the alkyl group, water-soluble salts of higher fatty acid monoglyceride monosulfates, such as the sodium salt of the monosulfated monoglyceride of hydrogenated coconut oil fatty acids, alkyl aryl sulfonates such as sodium dodecyl benzene sulfonate, higher alkyl sulfoacetates, higher fatty acid esters of 1,2-dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosinate, and the sodium, potassium, and ethanolamine salts of N-lauroyl, N-myristoly, or N-palmitoyl sarcosinate sold by W. R. Grace under the tradename "Hamposyl". Also effective are polycarboxylated ethylene oxide condensates of fatty alcohols manufactured by Olin under the tradename of "Polytergent CS-1".

Amphoteric surfactants are a well known class of surfactants which includes the alkyl beta-aminodipropionates $RN(C_2H_4COOM)_2$ and the alkyl beta-aminopropionates $RNHCH_4COOM$ where the alkyl group R contains 8 to 18 carbon atoms in both formulas and M is a salt-forming cation such as the sodium ion. Further examples are the long chain imidazole derivatives, for example, the di-sodium salt of lauroyl-cycloimidinium-1-ethoxy-ethionic acid-2-ethionic acid, and the substituted betaines such as alkyl dimethyl amminio acetates where the alkyl group contains 12 to 18 carbon atoms. N-alkyl-2-pyrrolidones which are highly polar apiotic solvents, are also surface active and can be used. "Surfadone LP-100" from International Specialty Products has been found particularly useful.

Suitable non-ionic surfactants include the polyoxyethylene-polyoxypropylene condensates, which are sold by BASF under the tradename "Pluronic", polyoxyethylene condensates of alkyl phenols; polyoxyethylene condensates of aliphatic alcohols/ethylene oxide condensates having from 1 to 30 moles of ethylene oxide per mole of coconut alcohol; ethoxylated long chain alcohols sold by Shell Chemical Co. under the tradename "Neodol", polyoxyethylene condensates of sorbitan fatty acids, alkanolamides, such as the monoalkoanolamides, dialkanolamides and the ethoxylated alkanolamides, for example coconut monoethanolamide, lauric isopropanolamide and lauric diethanolamide; and amine oxides for example dodecyldimethylamine oxide.

The wetting agent will generally be present in amounts of from about 0.05 to about 20.0% by weight based on the content of the reaction mixture, preferably from about 0.5 to about 10.0% by weight based on the total weight of the reaction mixture. The wetting agent is simply mixed with all the reactants and the mixture heated as described in U.S. Pat. No. 4,938,939.

The crystalline titanium silicates prepared in accordance with the invention are formed in a wide variety of particular sizes. Generally, the particles can be in the form of powder, a granule, or a molded product such as an extrudate having a particle size sufficient to pass through a 2 mesh (Tyler) screen and be maintained on a 400 mesh (Tyler) screen in cases where the catalyst is molded such as by extrusion. The titanium silicate can be extruded before drying or dried or partially dried and then extruded. For use as adsorbents, membranes of ETS-4 may be useful.

The novel polymorph-enriched ETS-4 materials of this invention are useful as adsorbents to separate gaseous and liquid mixtures and as catalysts. When particularly used as a catalyst, it is desired to incorporate the new crystalline titanium silicate, with another material resistant to the temperatures and other conditions employed in organic processes. Such materials include active and inactive materials and synthetic and naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new crystalline titanium silicate, i.e., combined therewith which is active, tends to improve the conversion and/or slectivity of the catalyst in certain organic conversion processes such as the cracking of n-hexane. Inactive materials suitably serve as diluents to control the amount of conversion in a given process so that products can be obtained economically and in an orderly manner without employing other means for controlling the rate of reaction. Normally, crystalline materials have been incorporated into naturally occurring clays, e.g., bentonite and kaolin to improve the crush strength of the catalyst under commercial operating conditions. These materials, i.e., clays, oxides, etc., function as binders for the catalyst. It is desirable to provide a catalyst having good crush strength because in a petroleum refinery the catalyst is often subjected to rough handling which tends to break the catalyst down into powder-like materials which cause problems in processing. These clay binders have been employed for the purpose of improving the crush strength of the catalyst.

Naturally occurring clays that can be composited with the crystalline titanium silicate described herein include the montmorillonite and kaolin family, which families include the sub-bentonites and the kaolins known commonly as Dixie, McNamee, Georgia and Florida or others in which the main constituent is halloysite, kaolinite, dickite, nacrite or anauxite. Such clays can be used in the raw state as originally mined or initially subjected to calcinations, acid treatment or chemical modification.

In addition to the foregoing materials, the crystalline titanium silicate may be composited with a porous matrix material such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix can be in the form of a cogel. The relative proportions of finally divided crystalline metal organosilicate and inorganic oxide gel matrix can vary widely with the crystalline organosilicate content ranging from about 1% to 90% by weight and more usually in the range of about 2% to about 50% by weight of the composite.

As is known in the art, it is desirable to limit the alkali metal content of materials used for acid catalyzed reactions. This is usually accomplished by ion exchange with hydrogen ions or precursors thereof such as ammonium and/or metal cations such as rare earth.

In order to more fully illustrate the nature of the invention and a manner of practicing the same, the following examples illustrate the best mode now contemplated.

EXAMPLE I

In this Example, the preparation of a polymorph-enriched ETS-4 is set forth.

The following ingredients were mixed in a beaker.

| Component | Amount |
|---|---|
| H2O | 4.0 grams |
| NaOH(s) | 2.0 grams |
| Sodiumsilicate[1] | 5.3 grams |
| Titanium oxide | 0.369 grams |
| ETS-4 | 0.041 grams |
| Sodium lauryl sulfate[2] | 0.50 grams |

[1]N-Brand ®
[2]Ivory Snow ®

The mixed reactants were poured into a Teflon-lined autoclave, which was sealed. The autoclave was heated to 225° C. and maintained at temperature for seventeen hours. The product was filtered and washed with hot water and dried at 100° C.

Figure 5:
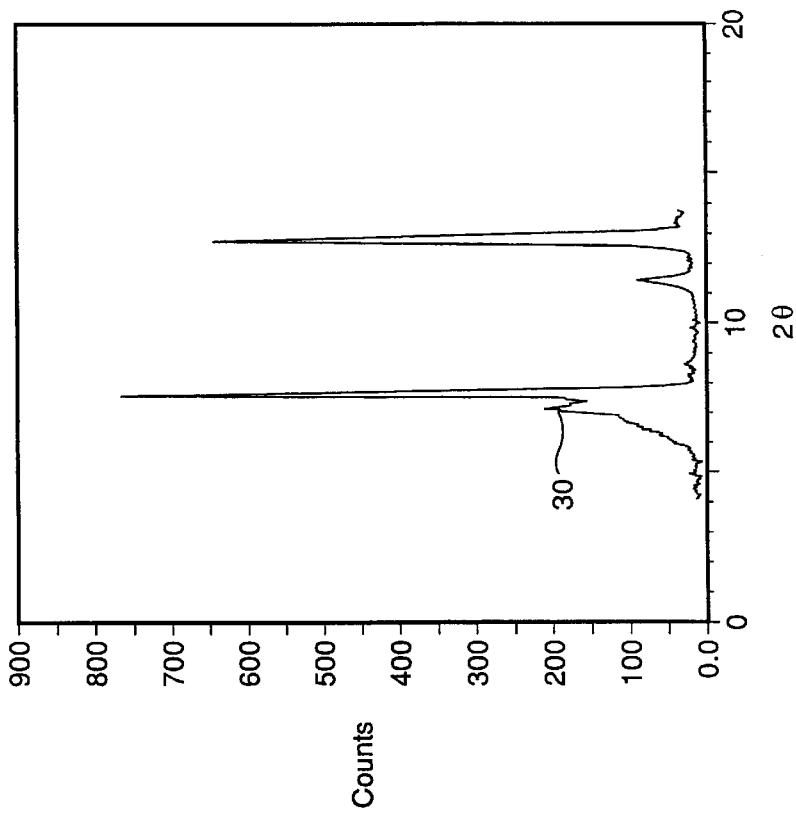
FIG. 5 is an X-ray diffraction pattern (0°–15°, 2θ) of a polymorph-enriched ETS-4.

FIG. 5 is an X-ray diffraction pattern of the product formed as above-described. The XRD pattern was formed on a Philips APD37320 diffractometer equipped with a theta compensator. The theta compensator maintains a constant area of illumination on the sample, so X-ray intensities obtained from a theta compensated unit are not directly comparable to those of a non-compensated unit. Thus, all values mentioned in the specification and claims with regard to the novel ETS-4 materials of this invention were determined by the theta compensated X-ray equipment. The radiation was the K-alpha doublet of copper, and a scintillation counter spectrometer was used. The peak heights, I, and the positions as a function of 2 times theta, where theta is the Bragg angle were read from the spectrometer chart. From these, the relative intensities, $100\ I/I_0$, where $I_0$ is the intensity of the strongest line or peak, and d, the interplanar spacing in angstroms, corresponding to the recorded lines, were calculated.

A comparison of FIG. 5 with FIG. 4, which is an XRD pattern of ETS-4 prepared by the standard method without wetting agent reveals that both materials contain the strong peaks corresponding to d-values of 11.65 Å and 6.95 Å. What is unique in the XRD pattern of the polymorph-enriched ETS-4 of this invention is the significant peak corresponding to a d-value of greater than 11.65 which is not seen in the ETS-4 material formed by the standard method. The peak shown indicated by reference numeral 30 is at a d-spacing of 12.5±0.25 Å.

EXAMPLE II

A polymorph-enriched ETS-4 was produced by the procedure of Example I. Exceptions included a reduced level of titanium dioxide (0.1575 grams versus 0.369 grams) and an increased level of ETS-4 seed (0.0525 grams versus 0.041 grams). The reactants were mixed and heated as set forth in Example I above.

FIG. 6 is the XRD pattern for the material, which was formed. As in FIGS. 4 and 5, the XRD pattern in FIG. 6 includes the strong peaks, which correspond to d-spacings of 11.65 Å and 6.95 Å. Further, similar to FIG. 5, the XRD pattern shows a distinct peak indicated by reference numeral 32 corresponding to a d-spacing of greater than 11.65 Å which peak is absent from the XRD pattern of ETS-4 formed by the standard procedure. The new peak 32 corresponds to a d-spacing of 13.9±0.25 Å.

DISCUSSION

The XRD patterns set forth in FIGS. 5 and 6 correspond almost perfectly with computer simulated XRD patterns developed from proposed polymorphs ABAB-AA and ABCD-AA as set forth in FIGS. 3(c) and 3(d). The proposed polymorphs and computer XRD simulation assumed zero faulting in the c-direction. The substantially perfect match between the computer simulated XRD pattern and those found with the formed materials shows that the material produced includes at least a portion of the ETS-4 polymorphs which are non-faulted in the c-direction of the crystal framework. The ETS-4 materials which are enriched in the polymorphs, which are non-faulted in the c-direction can be considered a different species of titanosilicate. Accordingly, these polymorphs of ETS-4, which contain the 12-ring channels interpenetrating the lattice framework in the c-direction have been given the name ETS-6.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A synthetic ETS-4 titanium silicate containing pores which interpenetrate the framework of the ETS-4 in the b- and c-directions.

2. The synthetic ETS-4 titanium silicate of claim 1, wherein said pores in the c-direction include c-directed channels formed from 12-membered pores.

3. The synthetic ETS-4 titanium silicate of claim 1, wherein said titanium silicate includes alkaline earth metal cations exchanged thereon.

4. The synthetic ETS-4 titanium silicate of claim 3, wherein said alkaline earth metal cations include barium, calcium or strontium.

5. The synthetic ETS-4 titanium silicate of claim 1, which has been heat treated to reduce the pores in the b-direction to less than 4 Å and the pores in the c-direction to less than 6 Å.

6. A synthetic ETS-4 titanium silicate, which comprises enriched portions of at least one polymorph of ETS-4 which contains non-faulted channels which penetrate the ETS-4 framework in the c-direction.

7. The synthetic ETS-4 titanium silicate of claim 6, comprising a mixture of two of said polymorphs, which contain channels which interpenetrate the framework of ETS-4 in the c-direction.

8. The synthetic ETS-4 titanium silicate of claim 6, which is exchanged with alkaline earth metal cations.

9. The synthetic ETS-4 titanium silicate of claim 8, wherein said alkaline earth metal cations include barium, calcium, or strontium.

10. The synthetic ETS-4 titanium silicate of claim 6, which has been heat treated to reduce the channels in the c-direction to less than 6 Å in diameter.

11. A process for the preparation of a crystalline titaniumsilicate molecular sieve zeolite having a pore size of approximately 3–5 Å units which comprises heating a reaction mixture containing a titanium source, a source of silica, a source of alkalinity,. a wetting agent, and water having a composition in terms of mole ratios falling within the following ranges:

$SiO_2/Ti$: 1–10

$H_2O/SiO_2$: 2–100

$M_n/SiO_2$: 0.1–10 where M indicates the cations of valence n derived from the source of alkalinity, and the wetting agent is present in amounts of 0.05 to 20 wt. % based on said reaction mixture, to a temperature of from about 100° C. to 300° C. for a period of time ranging from about eight hours to forty days while controlling the pH within the range of 10.45–11.1 said crystalline titanium silicate characterized by an X-ray powder diffraction pattern having the lines and relative intensities set forth in Table I below:

TABLE 1

| d-SPACING (ANGS.) | I/I$_0$ |
|---|---|
| 11.65 ± 0.25 | S-VS |
| 6.95 ± 0.25 | S-VS |
| 5.28 ± 0.15 | M-S |
| 4.45 ± 0.15 | W-M |
| 2.98 ± 0.05 | VS |

Where,
VS = 50–100
S = 30–70
M = 15–50
W = 5–30 wherein said X-ray powder diffraction pattern has an additional line at a d-spacing greater than 11.65 Å of a relative intensity I/I$_0$ of W-M.

12. The process of claim 11, wherein the reaction mixture has a composition in terms of mole ratios of oxides as follows:

$SiO_2/Ti$: 1–10

$H_2O/SiO_2$: 5–50

$M_n/SiO_2$: 0.5–5 and wherein said wetting agent is present in amounts of 0.05 to 10 wt. % based on the reaction mixture.

13. The process of claim 11, wherein the reaction mixture has a composition in terms of mole ratios of oxides as follows:

$SiO_2/Ti$: 2–3

$H_2O/SiO_2$: 10–25

$Mn/SiO_2$: 1–3 and wherein said wetting agent is present in amounts of 0.5 to 10 wt. % based on the reaction mixture.

14. The process of claim 11, wherein said wetting agent is a surfactant.

15. The process of claim 14, wherein said surfactant is an anionic surfactant.

16. The process of claim 15, wherein said anionic surfactant is sodium lauryl sulfate.

17. The process of claim 11, wherein said titanium source is titanium dioxide.

18. The process of claim 11, wherein said titanium source is a soluble titanium salt.

19. The process of claim 11, wherein the source of alkalinity is an alkaline metal hydroxide.

20. The process of claim 11, wherein said additional line of said X-ray powder diffraction pattern is at a d-spacing of 12.5±0.25 Å.

21. The process of claim 11, wherein said additional line of said X-ray powder diffraction pattern is at a d-spacing of 13.9±0.25 Å.

* * * * *